Figure 1:
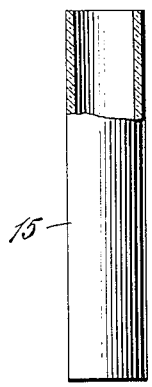

E. MILTNER.
MANUFACTURE OF HANDLES OF PLASTIC MATERIAL.
APPLICATION FILED MAY 21, 1910.

1,052,081.

Patented Feb. 4, 1913.

2 SHEETS—SHEET 1.

E. MILTNER.
MANUFACTURE OF HANDLES OF PLASTIC MATERIAL.
APPLICATION FILED MAY 21, 1910.
1,052,081.
Patented Feb. 4, 1913.
2 SHEETS—SHEET 2.
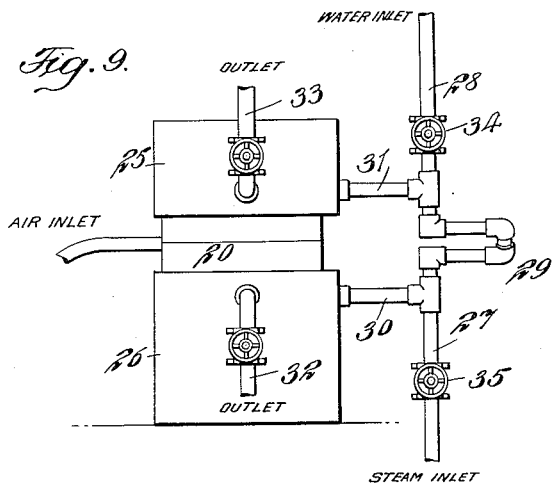
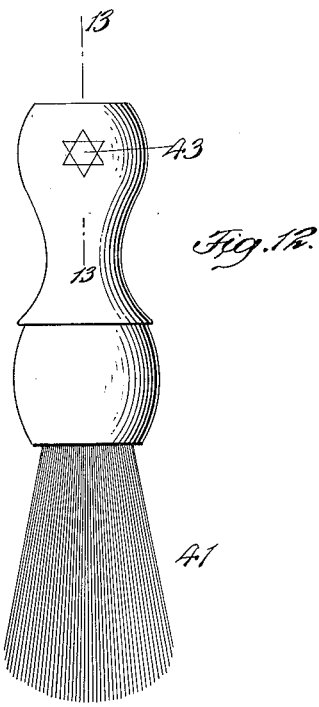
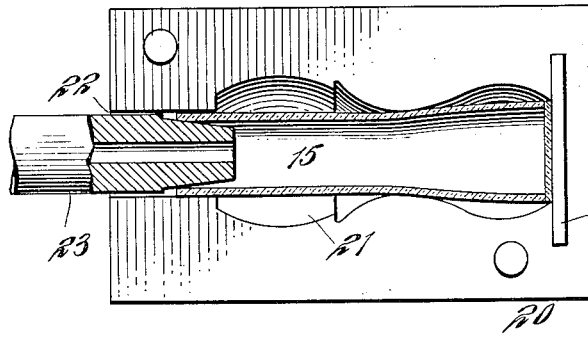
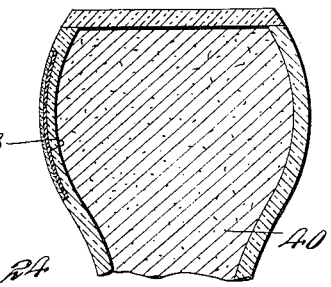
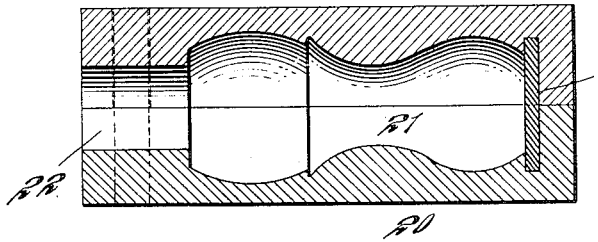
Witnesses:
Inventor
Ernest Miltner
By his Attorney

UNITED STATES PATENT OFFICE.

ERNEST MILTNER, OF NEWARK, NEW JERSEY, ASSIGNOR TO RUBBER & CELLULOID HARNESS TRIMMING CO., OF NEWARK, NEW JERSEY, A CORPORATION OF NEW JERSEY.

MANUFACTURE OF HANDLES OF PLASTIC MATERIAL.

1,052,081.      Specification of Letters Patent.      Patented Feb. 4, 1913.

Application filed May 21, 1910. Serial No. 562,572.

*To all whom it may concern:*

Be it known that I, ERNEST MILTNER, a citizen of the United States, and a resident of Newark, in the county of Essex and State of New Jersey, have invented certain new and useful Improvements in the Manufacture of Handles of Plastic Material, of which the following is a specification.

The invention relates to improvements in the production of handles and the like for brushes and other articles, and it consists in the novel features and methods hereinafter described, and particularly pointed out in the claims.

I present my invention herein as practised in the manufacture of hollow celluloid handles or handle-shells for shaving brushes and in the manufacture of brushes possessing such handles.

In accordance with my invention I preferably produce the handles from sections of a tube of celluloid of requisite length and thickness. The sections of the tube are treated to several steps whereby prior to their final transformation into a handle they become enlarged at one end and closed thereat. The sections after their preliminary treatment are inclosed within dies having matrices of the requisite or desired configuration and are expanded therein by air under pressure let into the sections until the tube-sections closely hug the walls of and take the outline of the matrices within the dies, the dies prior to and during the expansion of the tube sections being kept at a proper temperature by means of steam-coils. After the tube sections have taken their proper shape within the dies, the steam is cut off from the tables of the press holding the dies and water is caused to circulate through the same for the purpose of cooling the dies and "setting" the celluloid handle-shells therein.

In accordance with my methods of manufacture I am able to successfully produce hollow handles or handle-shells from celluloid, and further I am enabled to produce said handles or shells of economic thickness and without the shells after leaving the dies warping or to any material extent shrinking. The handles or handle shells may be used hollow or, if desired, may be filled with plaster of Paris or other suitable material, should it be desired to strengthen the handles or to add such weight thereto as might be necessary to properly balance the brush or other article to which the handle might be applied.

In accordance with my method I am enabled, also, during the production of the hollow handle or shell to apply thereon any letter, figure or design that might be desired as a name or trade-mark or ornamentation.

Figure 2:
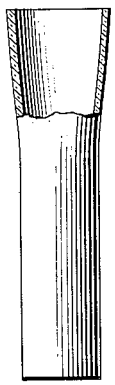
Figure 3:
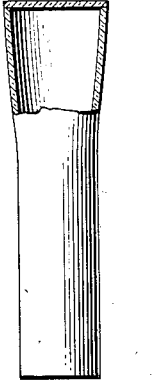
Figure 4:
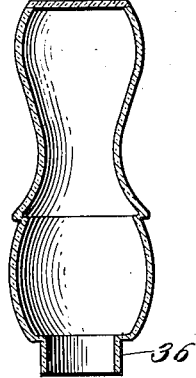
Figure 5:
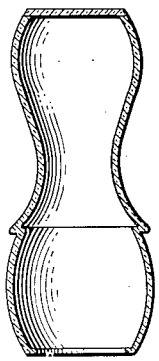
Figure 6:
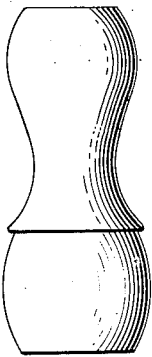
Figure 7:
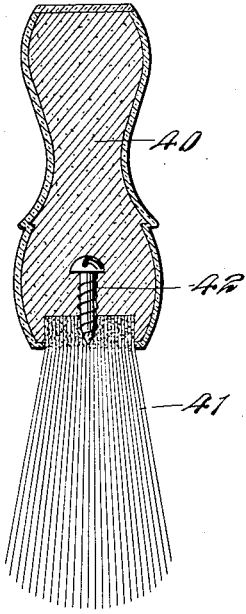
Figure 8:
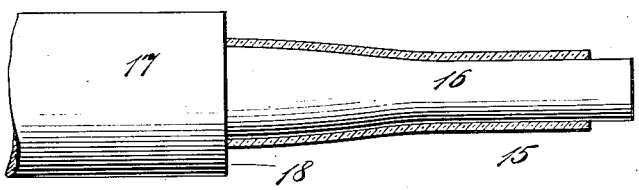

The invention will be fully understood from the detailed description hereinafter presented, reference being had to the accompanying drawings, in which:

Figure 1 is a side elevation, partly in section, of a section of a tube of celluloid with which I start the practice of my process; Fig. 2 is a like view of the same after one end portion of the tube has been expanded outwardly; Fig. 3 is a corresponding view of the same after a celluloid disk has been fitted to the enlarged outer end of the tube and secured thereto by celluloid cement or equivalent material; Fig. 4 is a central vertical section through a hollow handle or handle-shell as the same appears when taken from the die; Fig. 5 is a like view of the same after a waste end edge flange has been cut therefrom; Fig. 6 is a side elevation of the same; Fig. 7 is a central vertical section of the same shown as filled with plaster of Paris and in use as a handle for a shaving-brush; Fig. 8 is a detached view of a mandrel which I utilize to transform the plain cylindrical tube section shown in Fig. 1 to the outline represented in Fig. 2, the celluloid tube section being shown in section on the mandrel; Fig. 9 is a view of a press which may be employed in the practice of my process for heating the dies, applying air under pressure to the tube sections within the dies and finally circulating water about the dies to cool them and "set" the hollow celluloid shells then within the dies; Fig. 10 is a top view of the lower section of a die suitable for use in transforming the blank shown in Fig. 3 to the hollow shell illustrated in Fig. 4, the nozzle for air under pressure being shown as partly in section; Fig. 11 is a vertical section through a pair of dies, such as I employ, for producing the hollow celluloid handles; Fig. 12 is a side elevation of a finished shaving brush having a handle made in accordance with my invention, and Fig. 13 is a sectional view through a portion of the same on the dotted line 13—13 of Fig. 12.

In the drawings, the tube section with which I start my process is numbered 15 and shown in Fig. 1, and this section is simply a piece of plain cylindrical tubing of celluloid or other pyroxylin material. The first step in my process is to impart to one end of the tube 15 a diameter approximately that of the end of the finished handle to be produced, and in carrying out this step of the process I enlarge one end portion of the tube section 15 by heating the same and then forcing it upon a mandrel 16 (Fig. 8) of suitable diameter and form to swell out one end of the tube 15, leaving that end of the tube section with outwardly diverging walls and the other portion of the tube unchanged. The mandrel 16 projects from a stock 17 having a shoulder 18 against which the end of the tube section 15 is forced and which leaves said edge smooth and regular. After thus preparing the tube section with its enlargement at one end, I secure to the outer edges of said end a disk 19 of celluloid which will be caused to integrally unite with the tube section by the use of celluloid cement or a suitable solvent causing the adherence of the disk to the tube section. After the tube section has received the disk 19 closing one of its ends, it is in proper condition for application to the dies, and in Fig. 9 I illustrate said tube section positioned in the lower section of the die, which I number 20 and which contains a matrix 21 of suitable outline for the production of a shaving brush handle from the tube of celluloid. The die 20 has an open passage 22 which receives the outer end portion of the tube 15, as shown in Fig. 10, and also receives the nozzle 23 through which the air under pressure is applied to within the celluloid tube 15, said nozzle at its end entering within the tube 15 and being tapered so as to crowd the outer edges of said end against the walls of the passage 22 and create an air-tight joint between itself and the tube. At the inner end of the die 20 I preferably provide a vertical plate 24 against which the disk 19 of the celluloid tube presses and which is flat and forms a backing for said disk, leaving the disk without any seam line. It is my purpose to make the plate 24 detachable and to utilize it as a means for applying any trade-mark or the like that may be desired to the end of the brush handle, this being accomplished by causing the trade-mark or the like to be formed either in relief or intaglio on the plate 24, and, under the air pressure, causing the celluloid in the disk 19 to take the impression from the plate 24. The die 20 will, in practice, be held between upper and lower sections 25, 26 of a press which will be equipped with means for heating the dies and thereafter cooling the same. At present I illustrate the heating and cooling means as piping 27, 28 connected together by a pipe section 29 and respectively connected to the lower and upper sections of the press by means of pipes 30, 31. In heating the sections 25, 26 of the press I cause steam to flow through the pipes 27, 28 and into the lower and upper sections of the press through the pipes 30, 31, the outlets being at 32, 33, respectively. The valve 34 in the pipe 28 will be closed during the application of steam to the press. After the dies have been sufficiently heated to soften the celluloid tube therein, the air under pressure, say about sixty pounds, will be admitted through the nozzle 23 to the interior of the celluloid tube and will cause the same to expand outwardly against the inner walls of the die, the tube being thus transformed into a shell in the proper outline for a handle. After the tube of celluloid has been given the form of the handle I close the valve 35 in the pipe 27 so as to cut off the steam and open the valve 34 in the pipe 28 and cause cold water to flow through said pipe and into the pipe 27 and through the pipes 30, 31 to the sections of the press for the purpose of cooling the die and "setting" the celluloid handle-shell therein, and after the cooling has been effected I withdraw the die and remove the shell therefrom, the shell then being in the condition represented in Fig. 4 and of the outline of the desired handle with the exception of having at its lower open end a vertical flange 36 which not being necessary for a shaving brush handle, I remove to leave the shell in the condition represented in Figs. 5 and 6, wherein I show a horizontal flange encircling the mouth to the shell. The shell may be used hollow or it may be completely filled with plaster of Paris or other material 40, as shown in Fig. 7, in which I illustrate in section a completed shaving brush having the hollow shell handle made in accordance with my invention.

In the manufacture of the brush shown in Fig. 7, the inner end of the bunch of bristles 41 has thoroughly incorporated in it rubber which I vulcanize to form a knot of hard rubber, and I illustrate as screwed into the end of this knot, a screw 42 whose head is exposed beyond the end of the knot. The knot-end of the bristles carrying the screw 42 is inserted in the plaster of Paris while the latter is soft, within the shell-handle and the plaster of Paris is allowed to harden about the same and secure the body of bristles in position. The shell-handle when completed is in one integral piece with the sides of the shell merging into the edges of the disk 19 which becomes inseparable from the body of the handle.

I also by preference while forming the handle-shell apply thereto a trade-mark or ornamental design, as indicated in Figs. 12 and 13 where I illustrate the design as being a star. I may apply a plain design, like a star or a photograph or other illustration, to the handle-shell during its process of manufacture, and in accordance with my method the design applied to the shell is below the surface thereof and permanent with the handle. In carrying out this feature I take the design in the shape of a small slip or sheet or whatever it may be and coat the outer face of the same with a thin solution of transparent celluloid and then place the same within the die and against the appropriate portion of the matrix thereof and exterior to the celluloid tube, and thereafter upon the expanding of the tube under heat and pressure to form the handle, the celluloid in the tube will have pressed into it and embody the sheet or the like carrying the said design, and the celluloid which I first applied to the outer face of said sheet or the like will unite and become integral with the celluloid of the handle so that, as shown in Fig. 13, the sheet bearing the design and which I number 43 will be embedded in the material of the handle and effectually protected and preserved thereby.

I have employed the term "celluloid" in the foregoing description as denoting the preferred material used by me in manufacturing the handles. Celluloid is a pyroxylin material and the same material is well-known by other commercial names. My invention is not limited therefore to the use of the material technically called "celluloid", and I use the word celluloid in this application as denoting broadly pyroxylin material of the general character of commercial celluloid or any material of the plastic class capable of use in carrying out the essential features of my invention.

What I claim as my invention and desire to secure by Letters Patent, is:

1. The method described of producing a hollow shell of definite outline from plastic material which consists in forming a tube of such material open at both ends, expanding one end portion of said tube, uniting to said end of the tube a closing disk of the same material, applying said tube thus formed within a die or mold, softening the tube therein by heat applied to the exterior of the die or mold, and expanding the tube against the walls of the die or mold by air under pressure delivered within the tube through its open end.

2. The method described of producing a hollow shell of definite outline from plastic material which consists in forming a tube of such material open at both ends, expanding one end portion of said tube, uniting to said end of the tube a closing disk of the same material, applying said tube thus formed within a die or mold, softening the tube therein by heat applied to the exterior of the die or mold, expanding the tube against the walls of the die or mold by air under pressure delivered within the tube through its open end, and applying a cooling medium to the mold to cool the same and the shell therein.

Signed at New York, in the county of New York and State of New York, this 18th day of May A. D. 1910.

ERNEST MILTNER.

Witnesses:
 ARTHUR MARION,
 CHAS. C. GILL.